(12) United States Patent
Barry et al.

(10) Patent No.: US 6,504,631 B1
(45) Date of Patent: Jan. 7, 2003

(54) SYSTEM AND METHOD PROVIDING CONTROL CHANNEL FOR WAVELENGTH-DIVISION MULTIPLEXED NETWORK

(75) Inventors: Richard A. Barry, Brookline, MA (US); Naimish Patel, Massachusetts, MA (US); Eric Swanson, Acton, MA (US); Marc Robidas, Andover, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 0 days.

(21) Appl. No.: 09/251,814

(22) Filed: Feb. 17, 1999

(51) Int. Cl.$^7$ ............................................. H04B 10/00
(52) U.S. Cl. ................................................. 359/125
(58) Field of Search ........................... 359/110, 124, 359/125, 119, 128

(56) References Cited

U.S. PATENT DOCUMENTS

| | | | | |
|---|---|---|---|---|
| 4,956,550 A | * | 9/1990 | Edwards et al. | 250/227.15 |
| 5,452,115 A | | 9/1995 | Tomioka | 359/123 |
| 5,488,501 A | | 1/1996 | Barnsley | 359/137 |
| 5,617,233 A | * | 4/1997 | Boncek | 359/123 |
| 5,864,414 A | | 1/1999 | Barnsley et al. | 359/125 |
| 5,896,212 A | * | 4/1999 | Sotom | 359/125 |

OTHER PUBLICATIONS

Feiling, J., "A High–Capacity, Packet–Switched, Single––Hop Local Lightwave Network", IEEE Global Telecommunications Conference, Dec. 1993, vol. 2, pp. 1110–1114, especially the Abstract, (1993).

Perea Martins, J.E.M., "Simulation and Analysis of Collisionless Optical Interconnection Network", IEEE International Telecommunications Symposium, Aug. 1998, vol. 1, pp. 120–125, especially p. 120, (1998).

Borella, M., "A Reservation–Based Multicasting Protocol for WDM Local Lightwave Networks", IEEE 1995 pp. 1277–1281, especially the Abstract, (1995).

* cited by examiner

*Primary Examiner*—Leslie Pascal
*Assistant Examiner*—Agustin Bello
(74) *Attorney, Agent, or Firm*—Weingarten, Schurgin, Gagnebin & Lebovici LLP

(57) ABSTRACT

A network including a control channel source node and a plurality of control channel destination nodes is interconnected by communications media in the form of a ring. The control and control channel destination nodes transfer information over a plurality of channels using wavelength-division multiplex techniques. The control channel source node transmits control information to all of the control channel destination nodes over a unitary control channel, and each of the control channel destination nodes drains off a portion of the energy of the signal comprising the control channel to facilitate decoding and processing of the control information contained therein. Each of the aspects, the control channel destination nodes can also generate status information for transfer to the control channel source node over the control channel. The control channel source node drains off the energy of the signal comprising the control channel to facilitate decoding and processing of the status information contained therein.

16 Claims, 3 Drawing Sheets

SYSTEM AND METHOD PROVIDING CONTROL CHANNEL FOR WAVELENGTH-DIVISION MULTIPLEXED NETWORK

FIELD OF THE INVENTION

The invention relates generally to the field of digital data networks and more particularly to networks in which digital data is transferred using wavelength division multiplexing techniques. The invention particular provides an arrangement providing a control channel for carrying control information for use in network management and controlling operations of various nodes connected in such wavelength division multiplexing ("WDM") networks.

BACKGROUND OF THE INVENTION

Digital data networks are used to transfer data and other information among a plurality of devices, such as computers for processing, mass storage subsystems for storage and retrieval, connections to other networks such as the public telephony system and the like. As networks become larger, and with ever increasing numbers of devices being connected therein for transmitting and receiving information, the demand for information transfer bandwidth increases correspondingly. Since light beams have a higher information carrying capacity than electronic signals, optical information transfer techniques, in which information is transferred using beams of light through optical fibers are being increasingly used. In addition, since optical fibers can typically carry light beams of many different wavelengths concurrently, wave-division multiplexing techniques, in which information is transferred through a single optical fiber using a plurality of beams of light concurrently, are being employed to further increase the bandwidth.

A problem arises, however, in connection with use of light beams in information transfer. As is conventional, typically nodes in a network need to have various aspects of their operation be observed and controlled by, for example, a network administrator. Of particular interest in connection with nodes connected in a network in which information is transferred using light beams, the particular wavelengths that a node uses to communicate with other nodes, and the power of the light beams that are used, also need to be controlled. A special control console connected to all of the nodes over respective direct connections could be provided, but that would also increase the cost of the network. To avoid that, one of the nodes in the network can be provided with control console capabilities, but a mechanism is also needed by which that node transfers the control information to the other nodes in the network. If optical fibers are used to transfer the control information, generally each node, when it receives the light beam comprising the control channel, regenerates the light beam before transferring it to another node in the network, with the regeneration mechanisms increasing the cost of the node.

SUMMARY OF THE INVENTION

The invention provides a new and improved system and method for providing a control channel in a network in which digital data is transferred using wavelength-division multiplexing techniques.

In brief summary, in one aspect, the invention provides a network including a control channel source node and a plurality of control channel destination nodes interconnected by an optical fiber communications medium, the control channel source node and control channel destination nodes transferring information over a plurality of channels using wavelength-division multiplex techniques. The control channel source node transmits a light beam comprising the control channel to the control channel destination nodes over a unitary control channel. As each control channel destination node receives the light beam comprising the control channel, it drains off a portion of the energy of the light beam to facilitate decoding and processing of the control information contained therein. Generally, each control channel destination node will also transfer the remaining portion to another node, which may be either another control channel destination node or the control channel source node.

In another aspect, the invention provides a control channel source node for use in a network in which information is transferred using wavelength-division multiplexing techniques. The control channel source node generates a light beam comprising the control channel for transfer to other nodes, operating as control channel destination nodes, to transfer control information thereto over a unitary control channel.

In yet another aspect, the invention provides a control channel destination node for use in a network in which information is transferred using wavelength-division multiplexing techniques. The control channel destination node receives control information over a control channel generated by a control channel source node, and drains off a portion of the energy of the signal comprising the control channel to facilitate decoding and processing of the control information contained therein.

In further connection with each of the aspects, the control channel destination node(s) can also generate status information for transfer to the control channel source node over the control channel. The control channel source node drains off the energy of the signal comprising the control channel to facilitate decoding and processing of the status information contained therein.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
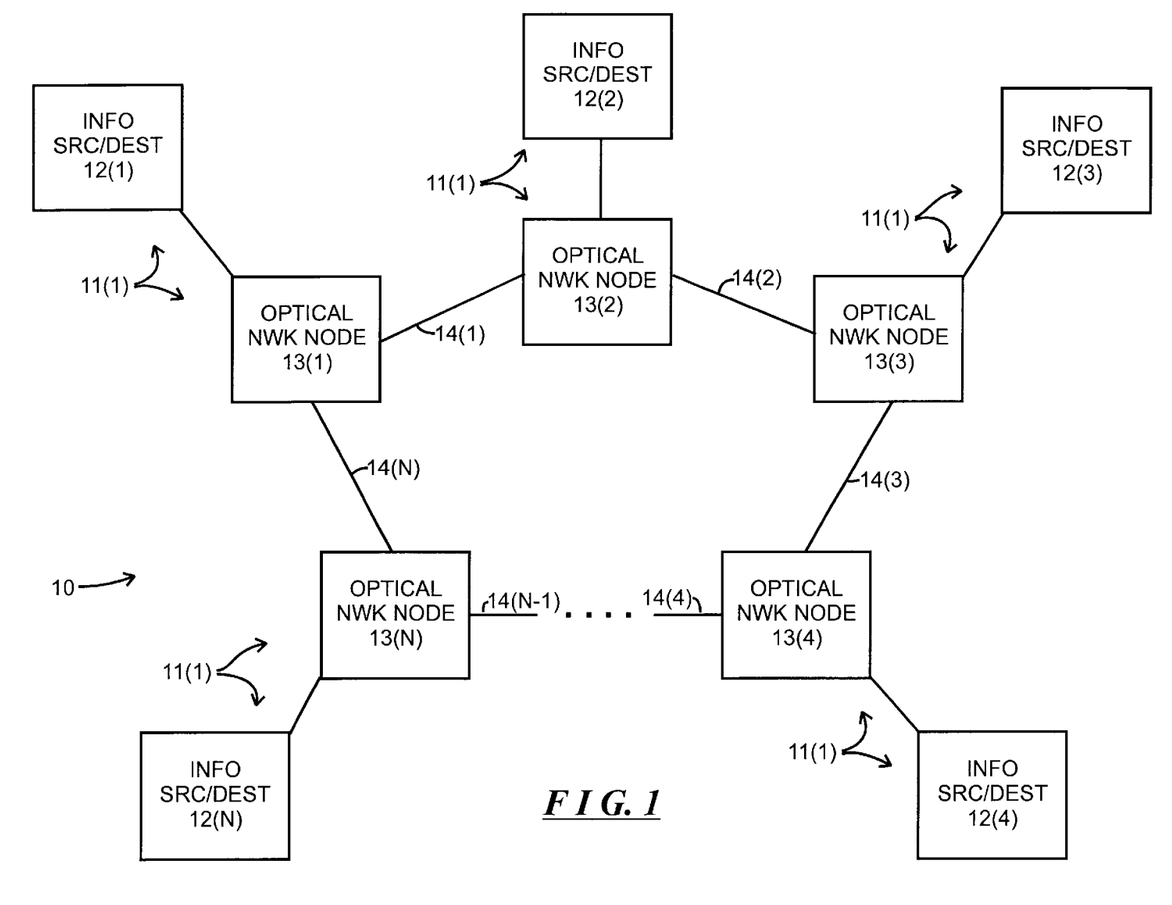
FIG. 1 is a functional block diagram of a WDM network providing a control channel for carrying control information, constructed in accordance with the invention.

FIG. 1 is a functional block diagram of a network 10 in which digital data is transferred using wavelength-division multiplexing (WDM) techniques, and providing a control channel for carrying control information, constructed in accordance with the invention. With reference to FIG. 1, network 10 includes a plurality of nodes 11(1) through 11(N) (generally identified by reference numeral 11(n)), each comprising information source/destination 12(n) and an optical network node 13(n) to communications media 14(n) which interconnect the nodes 11(n) to form the network 10. The topology of the network 10 is in the form of a ring, and thus each optical network node 13(n) can receive information from a preceding node 11(n−1) in the network and transmit information to a successive node 11(n+1) in the network, thereby to facilitate transfer of information in a clockwise direction, as shown in FIG. 1, through the network 10. In one embodiment, two communications media can be provided to interconnect each node 11(n) with the successive node 11 (n+1) in the network, and two communications media to interconnect each node 11(n) with the preceding node 11(n−1) in the network. In that embodiment, one set of communications media interconnecting the respective node 11(n) and successive and preceding nodes 11(n+1) and 11(n−1) is used to transfer information in a clockwise direction in the network 10, and the other set of communications media interconnecting the respective node 11(n) and successive and preceding nodes 11(n+1) and 11(n−1) is used to transfer information in a counter-clockwise direction in the network 10. Since the operations in connection with transfer of information in the clockwise and counter-clockwise directions are symmetric, and components in the respective nodes 11(n) used to transfer information are also symmetric as between transfer in the clockwise and counter-clockwise directions, in the following, operations in connection with transfer in one direction and components therefor will be discussed, with the understanding that such operations and components can be used in connection with transfer of information in either the clockwise or the counter-clockwise direction.

With continued reference to FIG. 1, the information source/destination 12(n) of each node 11(n) may be in the form of any equipment which can generate digital data for transfer over a network and/or which may need to receive and store or use digital data. Such equipment may include, for example, an individual digital computer or mass storage subsystems, local area networks ("LANs") including digital computers and/or mass storage subsystems together with other components such as network printers useful in such LANs, wide area networks ("WANs") including, for example, a plurality of LANs, the public switched telephony network ("PSTN"), ATM, SONET, and Internet traffic, and so forth. The optical network node 13(n) of the respective node 11(n) can receive information from the information source/destination 12(n) of the respective node 11(n) to be transferred over the network to another node 11(n') (n'≠n) as the destination node, and transmit the information over the communications medium 14(n) connected thereto. Information may be transmitted using any convenient information transfer protocol, including continuous transmission, in message packets or any other convenient form. The information transmitted by the optical network node 13(n) will be transferred through each successive optical network node 13(n"), 13(n'''), . . . (n", n'''≠n, n") as necessary until it (that is, the information) reaches the destination node 11(n'). When the information reaches the destination node 11(n'), the optical network node 13(n') will retrieve the information from the communications medium 14(n'−1) connected thereto for provision to its respective information source/destination 12(n'). Generally, each node 11(n) in the network 10 can operate both as a source node, to generate and transmit information over the communications media 14(n) to another node, and as a destination node, to receive and use information transmitted thereto from a source node, and so the optical network node 13(n) in the network 10 can operate to both transmit information over, and receive information from communications media 14(n) and 14(n−1), connected thereto. However, it will be appreciated that some nodes may operate only as source nodes or as destination nodes, and for such nodes the optical network node may not need to be able to receive or transmit information, respectively, over the network, except as will be described below in connection with the control channel.

As noted above, information is transferred through the network 10 using WDM techniques. The communications media 14(n) are in the form of optical fibers which transfer information in the form of light beams. The communications media 14(n) effectively transfer information between each pair of source and destination nodes $11(n_S)$, $11(n_D)$, with the optical network node $13(n_S)$ of the source node $11(n_S)$ injecting a light beam carrying the information into the communications medium $14(n_S)$ connected thereto, and the optical network node $13(n_D)$ of the destination node $11(n_D)$ ejecting the light beam carrying the information from the communications medium $14(n_{D-1})$ connected thereto. The optical network node $13(n_D)$ preferably ejects the light beam so as to minimize, or at least significantly reduce, the amount of energy of the light beam which might be transferred over the succeeding communications medium $14(n_D)$.

Generally, information between each pair of source and destination nodes 11(n), 11(n') will be transferred using a light beam of a particular wavelength. Light beams of different wavelengths can be used to transfer information between different pairs of source and destination nodes $11(n_S)$, $11(n_D)$; $11(n_S')$, $11(n_D')$; $11(n_S'')$, $11(n_D'')$, and so forth. Each communications medium 14(n) may carry light beams of multiple wavelengths, thereby providing wavelength-division multiplexed communications in the network. In addition, if the volume of information transferred between a pair of source and destination nodes $11(n_S)$, $11(n_D)$, is sufficiently large, or of the rate even for a relatively brief time is sufficiently high, it may be convenient to allow the pair of source and destination nodes to use multiple wavelengths to transfer the information. Essentially, each wavelength provides a channel over which the respective pairs of source and destination nodes $11(n_S)$ and $11(n_D)$ can transfer information.

The wavelengths of the light beams are chosen so that communications between one pair of source and destination nodes $11(n_S)$, $11(n_D)$ will not interfere with communications between another pair of source and destination nodes $11(n_S')$, $11(n_D')$, and, accordingly, preferably the same wavelength will not be used at least if a portion of the path over the communications media for the light beam between the one pair of source and destination nodes $11(n_S)$, $11(n_D)$, does not overlap with the path between the other pair of source and destination nodes $11(n_S')$, $11(n_D')$. On the other hand, if a destination node $11(n_D)$, when ejecting the light beam can provide that, even if some energy from the ejected light beam seeps into the succeeding communications medium, the amount of energy is sufficiently low that it would not interfere with communications between another pair of source and destination nodes $11(n_S')$, $11(n_D')$ the path between which does not overlap the path between the first pair of source and destination nodes $11(n_S)$ and $11(n_D)$, the light of the same wavelength may be used in connection with communications between the other pair of source and destination nodes $11(n_S')$, $11(n_D')$.

In addition to providing for transfer of information generally between pairs of source and destination nodes $11(n_S)$ and $11(n_D)$, the network 10 provides an arrangement by which one node, which will be referred to as a "master" node $11(n_M)$, can control various aspects of operations in connection with the other nodes, which will be generally referred to as slave nodes $11(n_C)$, using control information transferred over a unitary control channel. If, for example, node $11(1)$ comprises the master node, that node can, by transferring control information to the other nodes, control, for example, the wavelengths that the node can use in transferring information with other nodes, the power used by the node, enable a control channel destination node to provide it information as to its (that is, the control channel destination node's) operational status, power conditions for the various light beams for which the respective node is the destination node and/or through which the various light beams pass, and other operational aspects that will be familiar to those skilled in the art.

Instead of requiring a separate wavelength of light for communications between the master node $11(n_M)$ and each of the other nodes operating as slave nodes $11(n_C)$, which, it will be appreciated, could reduce the number of wavelengths which may be available for other communications, particularly if the number of nodes $11(n)$ in the network is relatively high, and also unduly complicate the master node $11(n_M)$ requiring not only generators (typically lasers) and receivers for generating and receiving light beams not only the of the wavelengths required for communication of information as required for the information source/destination $12(n_M)$ connected thereto, the invention provides an arrangement by which a light beam of the same wavelength, which will be referred to as the "control channel," is used for communication of control information in connection with all of the control channel destination nodes $11(n_C)$. In that arrangement, the light beam comprising the control channel originates at a control channel source node $11(n_{CS})$ and is transmitted to all of the other nodes, operating as control channel destination nodes $11(n_{CD})$. The control channel source node $11(n_{CS})$ may, but need be the master node $11(n_M)$. In the following, it will be assumed that the master node $11(n_M)$ is the control channel source node $11(n_{CS})$ The control information that is transferred over the control channel is preferably transferred in the form of message packets, which may be addressed to any of the control channel destination nodes $11(n_{CD})$. The message packets that are used may conform to any convenient packet transfer protocol. The optical network nodes $13(n_{CS})$ of each of the control channel destination nodes $11(n_{CD})$ drain off a portion of the energy of the light beam used for the control channel, and pass the remaining energy to the next node $11(n_{CD+1})$ in the network. In one embodiment, the optical network nodes $13(n_{CD})$ can also filter the drained off portion to minimize or otherwise reduce the energy of other wavelengths that might also have been drained off. The optical network nodes $13(n_{CD})$ will convert the light beam to electronic signals for processing in a conventional manner. For example, if control information is to be processed by a particular control channel destination node $11(n_{CD})$, which the respective control channel destination node $11(n_{CD})$ can determine by means of address information which will be included in the control information, the particular control channel destination node $11(n_{CD})$ can process the information and perform operations required thereby. If control information is not to be processed by the particular control channel destination node $11(n_{CD})$, as determined by the address information included therewith, the control channel destination node can ignore the control information.

If the control information received by a control channel destination node $11(n_{CD})$ to enable it (that is, the control channel destination node $11(n_{CD})$) to transmit status information to the control channel source node $11(n_{CS})$, after the control channel destination node $11(n_{CD})$ has generated the status information, and when it has access to the control channel, as determined by the information transfer protocol used for the control channel, the control channel destination node $11(n_{CD})$ transmits the status information, using a light beam of the wavelength for the control channel, in a message packet of the respective information transfer protocol. The power with which the control channel destination node $11(n_{CD})$ transmits the light beam comprising the status information will have previously been controlled by appropriate control information provided to the control channel destination node $11(n_{CD})$ by the control channel source node $11(n_{CS})$, and will be sufficient to ensure that the light beam will be of sufficient power that the control channel source node $11(n_{CS})$ will be able to receive it, taking into account that any control channel destination nodes in the ring between the particular control channel destination node $11(n_{CD})$ that transmits the light beam comprising status information and the control channel source node $11(n_{CS})$ will be draining off its respective portion of the light beam transmitted by the control channel destination node $11(n_{CD})$, as they would with a light beam containing control information transmitted by the control channel source node $11(n_{CS})$.

Figure 2:
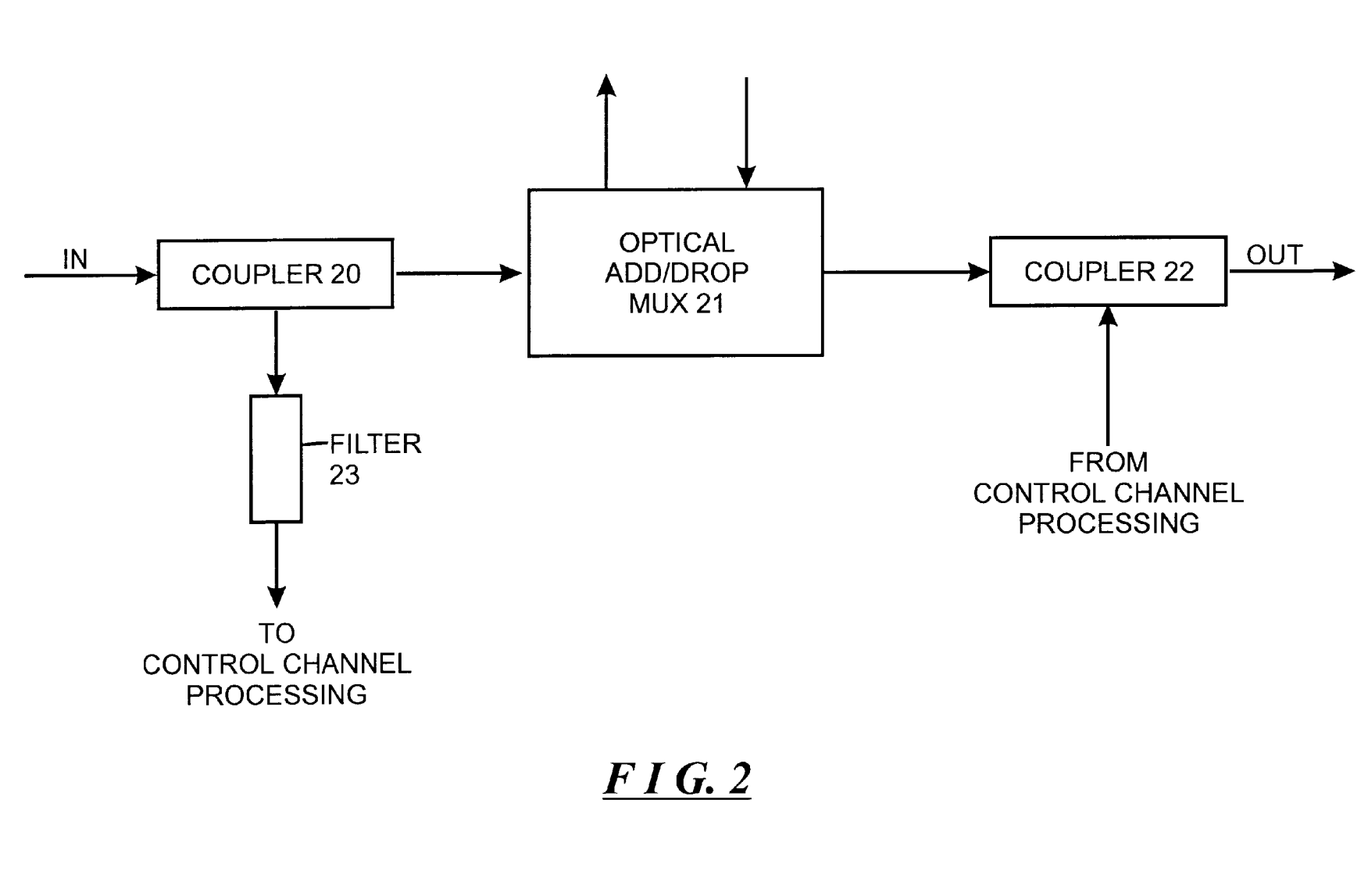
FIG. 2 is a functional block diagram of a control channel source node for use in the WDM network.
Figure 3:
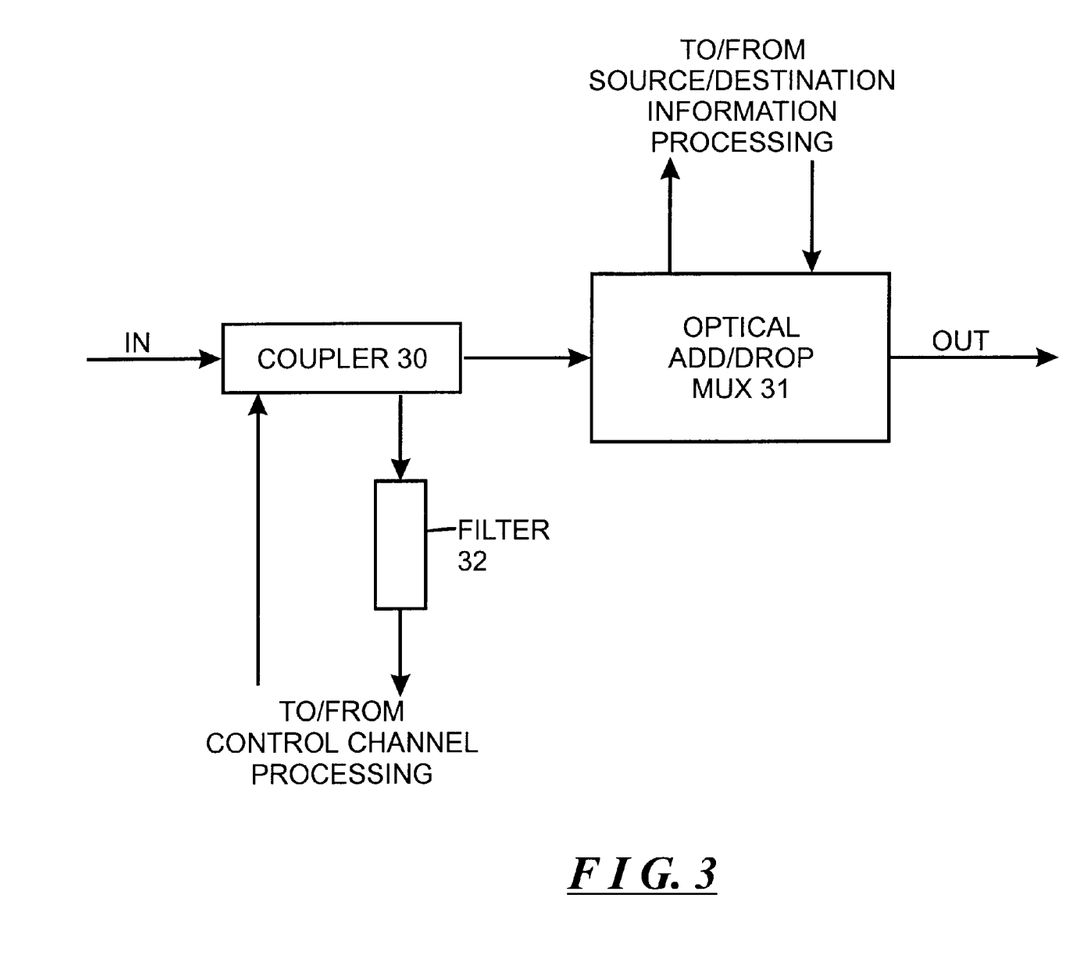
FIG. 3 is a functional block diagram of a control channel destination node for use in the WDM network.

FIGS. 2 and 3 depict functional block diagrams of portions of the optical network nodes $13(n_{CS})$ and $13(n_{CD})$ for the control channel source node $11(n_{CS})$ and a control channel destination node $11(n_{CD})$ constructed in accordance with the invention. With reference initially to FIG. 2, the optical network node $13(n_{CS})$ of the control channel source node $11(n_{CS})$ includes an optical path comprising an input coupler 20, an optical add/drop multiplexer 21, and an output coupler 22. The input coupler 20 is connected to the optical fiber comprising communication medium $14(n_{M-1})$ to receive the light beam(s) that are transferred thereover. For the light beams that it receives of wavelengths other than the wavelength comprising the control channel, the input coupler 20 couples them to the optical add/drop multiplexer 21 with undiminished power, except possibly for some slight attenuation. The optical add/drop multiplexer 21 also allows light beams of wavelengths for which the control channel source node $11(n_{CS})$ is not the destination node to be coupled to the output coupler 22, which, in turn, couples them to the optical fiber comprising communication medium $14(n_{CS})$ for transfer to the next node $11(n_{CS+1})$ in the network.

On the other hand, for light beams of wavelengths for which the control channel source node $11(n_{CS})$ is the destination node, the optical add/drop multiplexer 21 diverts them (that is, the light beams) from the optical path and couples them to information processing circuitry (not separately shown), thereby to eject the light beams of those wavelengths from the optical path. The information processing circuitry will typically convert the light beams to electronic form to enable the information to be decoded from the light beams generated by the respective source nodes, and process the decoded information as required, typically to provide the decoded information to the information source/destination $12(n_{CS})$ of the control channel source node $11(n_{CS})$. In addition, the optical add/drop multiplexer 21 receives light beams comprising information for which the control channel source node $11(n_{CS})$ is the source node, generated in response to information provided thereto by the information source/destination $12(n_{CS})$, and inserts them (that is, the light beams) into the optical path, thereby to inject the light beams of those wavelengths into the optical path. In that operation, the optical add/drop multiplexer 21 transfers the light beams to the output coupler, which, in turn, couples them to the optical fiber comprising communication medium $14(n_{CS})$ for transfer to the next node $11(n_{CS+1})$ in the network.

When the control channel source node $11(n_{CS})$ is to transmit control information over the control channel, the control channel processing circuitry generates a light beam comprising the control information and provides it to the output coupler 22. The output coupler 22 receives the light beam comprising the control channel from the control channel processing circuitry and injects it into the optical path, in the process transmitting the light beam over the communications medium $14(n_{CS})$ to the next node $11(n_{CS+1})$ in the network 10.

For the light beam that the control channel source node $11(n_{CS})$ receives comprising the control channel, the input coupler 20 diverts all of the energy of that light beam to control channel processing circuitry (not separately shown), thereby to eject the control channel from the optical path. The light beam that is diverted by the input coupler 20 may comprise a portion of the light beam containing control information that was transmitted by the control channel source node $11(n_{CS})$ that was not diverted by the control channel destination nodes $11(n_{CD})$ in the network 10. In addition, the light beam that is diverted by the input coupler 20 may contain status information provided by a control channel destination node $11(n_{CD})$. As with any light beams provided to the information processing circuitry by the optical add/drop multiplexer 21, the control channel processing circuitry will initially convert the light beam comprising the control channel to electronic form for decoding and processing. For the decoded information that corresponds to control information that was transmitted by the control channel source node $11(n_{CS})$, the control channel processing circuitry can either discard the decoded control information, or alternatively it (that is, the control channel processing circuitry) can compare the decoded control information to the control information that was originally transmitted to verify that the control channel information was transmitted through the network correctly. In addition, if, while transmitting over the control channel, the control channel source node $11(n_{CS})$ does not receive control channel information corresponding to what it had transmitted, it can determine that a discontinuity exists somewhere in the optical path from the output coupler 22, over the communication media 14(n) and through the optical network nodes 13(s) to the input coupler 20. Similarly, while transmitting over the control channel, the control channel source node can make measure the power and loss for the light beam comprising the control channel. On the other hand, for the decoded information that corresponds to status information that was transmitted by a control channel destination node $11(n_{CD})$, the control channel processing circuitry can process the decoded status information in a conventional manner as will be apparent to those skilled in the art. A filter 23 is provided to filter out energy for light beams other than the light beam comprising the control channel in the event that the input coupler 20 diverts power therefor, so that the diverted light beam as provided to the control channel processing circuitry only comprises the control channel.

FIG. 3 depicts a functional block diagram of a portion of the optical network node $13(n_{CD})$ for a control channel destination node $11(n_{CD})$ constructed in accordance with the invention. With reference to FIG. 3, the optical network node $13(n_{CD})$ of the control channel destination node $11(n_{CD})$ includes an optical path comprising a single coupler 30 and an optical add/drop multiplexer 31. The coupler 30 is connected to the optical fiber comprising communication medium $14(n_{C-1})$ to receive the light beam(s) that are transferred thereover. For the light beams that it receives of wavelengths other than the wavelength comprising the control channel, the coupler 30 couples them to the optical add/drop multiplexer 31 with substantially undiminished power. The optical add/drop multiplexer 31 also allows light beams of wavelengths for which the control channel source node $11(n_{CS})$ is not the destination node to be coupled to the optical fiber comprising communication medium $14(n_{CD})$ for transfer to the next node $11(n_{CD+1})$ in the network.

On the other hand, for light beams of wavelengths for which the control channel destination node $11(n_{CD})$ is the destination node, the optical add/drop multiplexer 31 diverts them (that is, the light beams) from the optical path and couples them to information processing circuitry (not separately shown), thereby to eject the light beams of those wavelengths from the optical path. The information processing circuitry will typically convert the light beams to electronic form to enable the information to be decoded from the light beams generated by the respective source nodes and process the decoded information as required, typically to provide the decoded information to the information source/destination $12(n_{CD})$ of the control channel source node $11(n_C)$. In addition, the optical add/drop multiplexer 31 receives light beams comprising information for which the control channel source node $11(n_C)$ is the source node, generated in response to information provided thereto by the information source/destination $12(n_{CD})$, and inserts them (that is, the light beams) into the optical path, thereby to inject the light beams of those wavelengths into the optical path. In that operation, the optical add/drop multiplexer 31 couples them to the optical fiber comprising communication medium $14(n_{CD})$ for transfer to the next node $11(n_{CD+1})$ in the network.

In accordance with the invention, for the light beam that the control channel destination node $11(n_{CD})$ receives comprising the control channel, the coupler 30 diverts a portion of the power for that light beam to control channel processing circuitry (not separately shown). The portion of the power that is diverted will be sufficient to allow the control channel processing circuitry to convert the light beam to electronic form and decode and process the control or status information contained therein. In one particular embodiment, the coupler 30 diverts five percent of the energy of the light beam comprising the control channel, and allows ninety-five percent of the energy to proceed to the optical add/drop multiplexer 31 for transfer over the communication medium $14(n_{CD})$ to the next node $11(n_{CD+1})$. A filter 32 is provided to filter out energy for light beams other than the light beam comprising the control channel in the event that the coupler 30 diverts power therefor, so that the diverted light beam as provided to the control channel processing circuitry only comprises the control channel. If the control channel destination node $11(n_{CD})$ is to transmit status information over the control channel, the coupler 30 can also receive the light beam therefor from the control channel processing circuitry and inject it into the optical path, in the process transmitting the light beam over the communications medium $14(n_{CD})$ to the next node $11(nCD_{+1})$ in the network 10.

The optical couplers 20 and 22 forming part of the optical network node $13(n_{CS})$ of the control channel source node $11(n_{CS})$ and the optical coupler 30 forming part of the optical network node $13(n_{CD})$ of each control channel destination node $11(n_{CD})$ may be of any convenient form. Preferably, the input optical coupler 20 will serve to divert all of the energy of the light beam comprising the control channel received thereby to the control channel processing, to ensure that little if any energy reaches the output coupler 22 and is retransmitted over the communication medium $14(n_{CS})$.

Thus, the input optical coupler 20 and output optical coupler 22, may together form an optical add/drop multiplexer similar to optical add/drop multiplexer 21 for the control channel.

On the other hand, as noted above, the optical coupler 30 diverts a small portion of the energy of the light beam comprising the control channel, in one embodiment typically on the order of five percent, and may be in the form, for example, of a 95/5 tap coupler, which diverts five percent of the energy of all of the light beams input thereto in a particular portion of the spectrum, and a filter (which may comprise filter 32, or an additional filter) to filter out the energy of any light beams in the spectrum that may have been diverted, other than that for the control channel. Other types of couplers can also be used. Alternately, the optical coupler 30 may comprise an optical add/drop multiplexer and a 95/5 coupler. In that case, the optical add/drop multiplexer would divert substantially all of the energy of the light beam for the control channel to the input of the 95/5 coupler, while allowing substantially all of the energy for the other light beams to be directed to the optical add/drop multiplexer 31. The 95/5 coupler, in turn, serves to divert five percent of the energy to the control channel processing, and return the other ninety-five percent to the optical add/drop multiplex of coupler 30 to be re-injected into the optical path and directed toward optical add/drop multiplexer 31.

Other devices and architectures for the couplers 20, 22 and 30 will be apparent to those skilled in the art.

The invention provides a number of advantages. In particular, the invention provides a unitary control channel for a network in which information is transferred using light beams in a wave-division multiplexed manner over a plurality of channels each comprising a light beam of a predetermined wavelength. Since the network only requires a single control channel, other channels, of other wavelengths, are available for use in transferring other information between nodes of the network. A control channel constructed in accordance with the invention can be substantially less expensive than an arrangement requiring regeneration at every node, since in such an arrangement a regenerator including an optical add/drop multiplexer, receiver, laser and possibly amplifier and variable optical attenuator will be required at each node. In addition, since the propagation loss of a light beam traveling through an optical coupler is considerably lower than through an optical add/drop multiplexer, since optical couplers 20, 22 and 30, are used instead of optical add/drop multiplexers for the control channel, propagation losses of all light beams transferred through the network will be significantly lower than otherwise. Since propagation losses are lower, light beams can be transmitted through the network at lower power levels without needing regeneration.

In addition, a control channel constructed in accordance with the invention can provide enhanced reliability over, for example, a control channel in which each of the nodes in the network drops the control channel and reinserts or regenerates it, using, for example, an add/drop multiplexer similar to add/drop multiplexer 21 and 31. In that case, if a node were to malfunction, it may not be able to regenerate the control channel, in which case control of nodes downstream of the malfunctioning node may be lost.

Furthermore, since the control channel is a unitary channel, the control channel source node $11(n_{CS})$ can use the control channel to verify that the communications media $14(n)$ provide a continuous path around the network. In addition, if the communications media $14(n)$ does provide a continuous path, it will be appreciated that the control channel source node $11(n_{CS})$ will be able to measure propagation losses therethrough around the network. If a network includes one or more nodes which regenerate the control channel, similar continuity verification and propagation loss measurements can be performed on a piecewise basis from the control channel source node $11(n_{CS})$ to the first control channel regeneration node, between pairs of control channel regeneration nodes, and from the last control channel regeneration node to the control channel source node $11(n_{CS})$.

It will be appreciated that a number of modifications may be made to the network 10 described above in connection with FIGS. 1 through 3. As noted above, the network 10 may provide a plurality of communications paths, including the clockwise path described above, and a counter-clockwise communications path. In addition, although the network has been described as having a ring topology, it will be appreciated that network may have any of a number of types of topologies including, for example, buses, trees, meshes and the like.

In addition, although the network 10 has been described as having a single control channel master node $11(n_M)$, it will be appreciated that a plurality of control channel master nodes $11(n_M)$ may be provided, or. If a plurality of control channel source nodes $11(n_M)$ are provided, one may be an active control channel source node at any point in time, and another may be inactive until, for example, the currently-active control channel source node malfunctions, at which point a currently-inactive control channel source node can become active and enable the malfunctioning node to become inactive.

Similarly, although the network 10 has been described as having control channel destination nodes $11(n_{CD})$ all of which include couplers 30 which divert a portion of the energy of the light beam comprising the control channel, it will be appreciated that some of the control channel destination nodes $11(n_{CD})$ may instead or in addition have regenerators for regenerating the light beam.

Furthermore, although the coupler 30 of the control channel destination node $11(n_{CD})$ has been described as diverting five percent of the energy of the light beam comprising the control channel, it will be appreciated that the coupler 30 may divert any convenient percentage, and the percentages may differ as among the various control channel destination nodes. It is desirable that the amount of energy that is diverted by any particular control channel destination node $11(n_{CD})$ be high enough so that the control channel destination node $11(n_{CD})$ can convert the light beam to electronic form and reliably decode the control information contained therein, yet not be so high as might disable other control channel destination nodes $11(n_C')$, $11(n_C'')$, . . . from doing so.

In addition, although the optical network nodes of both the control channel source node $11(n_{CS})$ and the control channel destination nodes $11(n_C')$, $11(n_C'')$, . . . are described as having respective filters 23 and 32, it will be appreciated that the nodes may not have such filters.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

What is claimed is:

1. A network comprising a plurality of nodes interconnected by communication links, the nodes being configured to selectively transfer information thereamong using a wavelength-division multiplexing technique using a light beam of a plurality of wavelengths, one of the wavelengths being selected as a unitary control channel for transferring control information from one of said nodes to others of said nodes, the control information identifying which of the wavelengths are to be used by the other nodes in transmitting information to each other and identifying respective optical power levels of such transmissions, each of the other nodes receiving over a corresponding one of the communication links the light beam comprising the control channel, draining off a predetermined portion of energy thereof to facilitate use of the control information thereby and coupling the remainder of the energy thereof over one of the communication links to another of said other node, each of the other nodes being operative to determine from address information in the control channel whether the control information carried by the control channel is destined for the node.

2. A network as defined in claim 1 in which said at least one of said other nodes comprises an optical network node comprising an optical coupler configured to receive over one of the communication links the light beam comprising the control channel, drain off said predetermined portion of energy thereof and facilitate the coupling the remainder of the energy thereof over one of the communication links to another of said other nodes.

3. A network as defined in claim 2 in which said optical coupler is configured to drain off five percent of energy of the light beam comprising the control channel.

4. A network as defined in claim 2 in which said at least one of said other nodes further includes an optical add/drop multiplexer configured to facilitate transfer of information thereby using light of at least one wavelength other than said control channel.

5. A network as defined in claim 2 in which said at least one of said other nodes further includes a filter configured to filter from the drained off portion light of wavelengths other than the wavelength selected as the control channel.

6. A network as defined in claim 1 in which at least one of said other nodes is configured to provide information to another of said nodes.

7. A network as defined in claim 6 in which said at least one of said other nodes is operative to provide, via the control channel, information as to its operational status.

8. A network as defined in claim 6 in which said at least one of said other nodes is operative to provide, via the control channel, information as to power conditions for those light beams for which said one node is the destination node.

9. A network as defined in claim 6 in which said at least one of said other nodes is operative to provide, via the control channel, information as to power conditions for those light beams passing through said one node.

10. A network as defined in claim 6 in which said one of said other nodes further includes an optical add/drop multiplexer configured to facilitate transfer of information thereby using light of at least one wavelength other than said control channel.

11. A network as defined in claim 6 in which said at least one of said other nodes comprises an optical network node comprising an optical coupler configured to transmit over one of the communication links the status information using a light beam of the wavelength comprising the control channel.

12. A network as defined in claim 11 in which said one of said nodes comprises an optical network node comprising an optical coupler configured to receive over one of the communication links the light beam comprising the control channel and drain off energy thereof.

13. A network as defined in claim 12 in which said optical coupler is configured to drain off five percent of energy of the light beam comprising the control channel.

14. A network as defined in claim 12 in which said one of said other nodes further includes a filter configured to filter from the drained off portion light of wavelengths other than the wavelength selected as the control channel.

15. A network comprising a plurality of nodes interconnected by communication links, the nodes being configured to selectively transfer information thereamong using a wavelength-division multiplexing technique using a light beam of a plurality of wavelengths, one of the wavelengths being selected as a unitary control channel for transferring control information from one of said nodes to others of said nodes, the control information identifying which of the wavelengths are to be used by the other nodes in transmitting information to each other, each of the other nodes receiving over a corresponding one of the communication links the light beam comprising the control channel, draining off a predetermined portion of energy thereof to facilitate use of the control information thereby and coupling the remainder of the energy thereof over one of the communication links to another of said other nodes, each of the other nodes being operative to determine from address information in the control channel whether the control information carried by the control channel is destined for the node.

16. A network comprising a plurality of nodes interconnected by communication links, the nodes being configured to selectively transfer information thereamong using a wavelength-division multiplexing technique using a light beam of a plurality of wavelengths, one of the wavelengths being selected as a unitary control channel for transferring control information from one of said nodes to others of said nodes, the control information identifying respective optical power levels of the optical transmissions among the other nodes, each of the other nodes receiving over a corresponding one of the communication links the light beam comprising the control channel, draining off a predetermined portion of energy thereof to facilitate use of the control information thereby and coupling the remainder of the energy thereof over one of the communication links to another of said other nodes, each of the other nodes being operative to determine from address information in the control channel whether the control information carried by the control channel is destined for the node.

* * * * *

UNITED STATES PATENT AND TRADEMARK OFFICE
CERTIFICATE OF CORRECTION

PATENT NO.    : 6,504,631 B1
DATED         : January 7, 2003
INVENTOR(S)   : Richard A. Barry, et al.

It is certified that error appears in the above-identified patent and that said Letters Patent is hereby corrected as shown below:

<u>Title page,</u>
Item [75], Inventors, "Naimish Patel, Massachusetts, MA (US)" should read
-- Naimish Patel, North Andover, MA (US) --; and "Marc Robidas, Andover, MA (US)" should read -- Marc Robidas, Chelmsford, MA (US) --;

<u>Column 8,</u>
Lines 56-57, "$(nCD_{+1})$" should read -- $(n_{CD+1})$ --; and <u>Column 11,</u>
Line 20, "node," should read -- nodes, --.

Signed and Sealed this

Twenty-third Day of September, 2003

JAMES E. ROGAN
*Director of the United States Patent and Trademark Office*